United States Patent Office 2,962,911
Patented Dec. 6, 1960

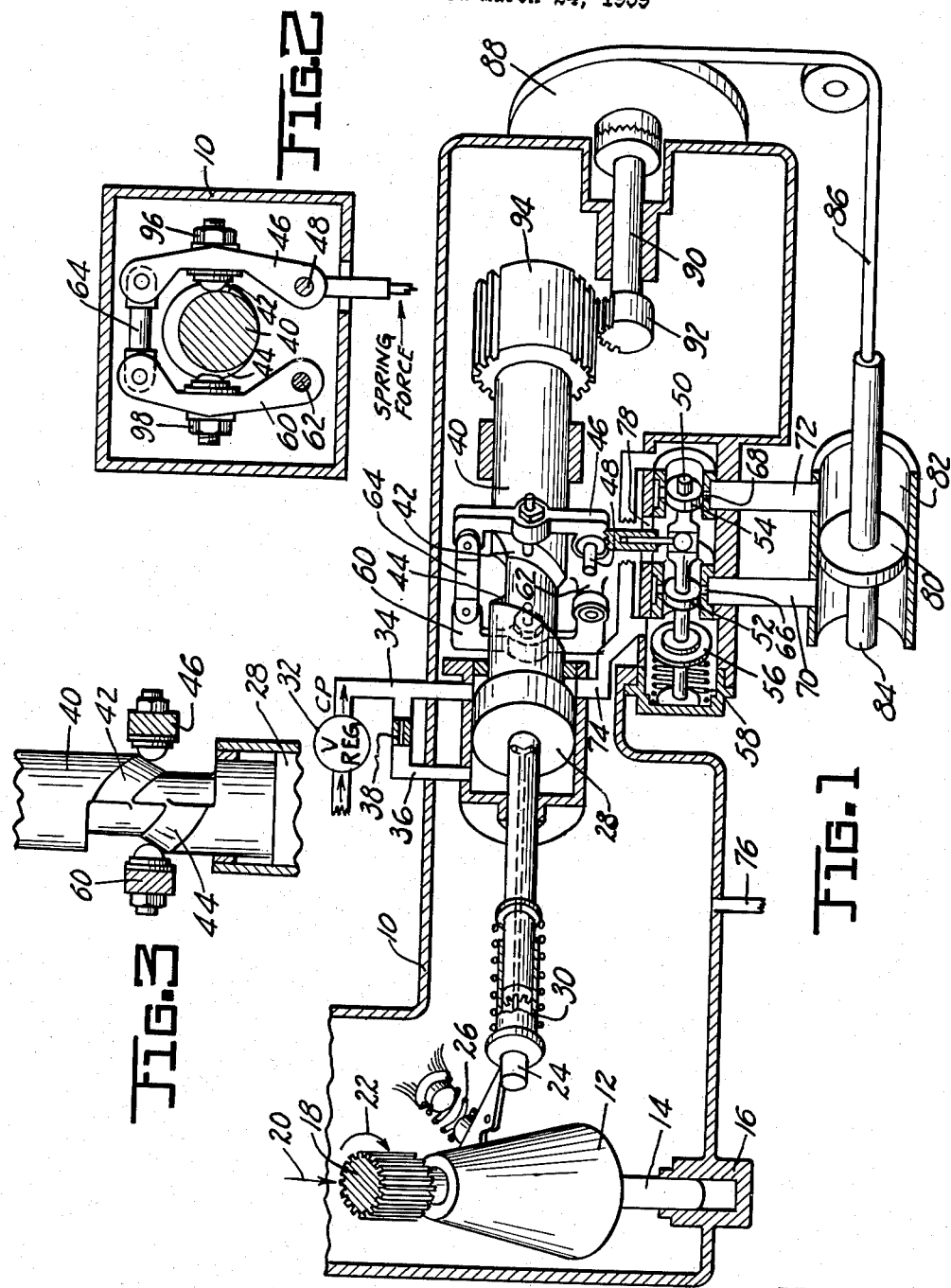

2,962,911

SIGNAL COMBINING APPARATUS

Russell Crews Perkey and Francis R. Rogers, South Bend, Ind., assignors to The Bendix Corporation, a corporation of Delaware Filed Mar. 24, 1959, Ser. No. 801,499

9 Claims. (Cl. 74—388)

The present invention relates to means for combining a plurality of control signals and positioning an output member in response thereto.

It is an object of the present invention to provide signal comparison means for computing the error between a mechanical signal input and position feedback of an output member and to accurately position said output member as a function of the error.

It is another object of the present invention to provide a three dimensional cam comparison means including a cam follower which may be positively positioned for both increasing and decreasing cam contour.

It is a further object of the present invention to provide combining means having a three dimensional cam surface and a follower resiliently fixed into contact with said surface and further including means to limit the amount said follower may lift off said cam surface.

Other objects and advantages of the present invention will become apparent in view of the following description taken in conjunction with the drawings wherein:

Figure 1 is a perspective view of our combining apparatus in combination with a hydromechanical system for amplifying the power and stroke of an input member;

Figure 2 is a section view taken along a vertical plane passing through our combining apparatus; and Figure 3 is a section view taken along a horizontal plane passing through our combining apparatus.

In Figure 1, control apparatus for hydromechanically amplifying the power and stroke of an input member is shown in a housing 10 and includes a three dimensional cam member 12 integrally mounted on a shaft 14 which is both slidably and rotatably mounted in the support 16 formed in housing 10. A gear 18 is formed on one end of shaft 14 and may be positioned axially in response to a first preliminary signal and rotatably in response to a second preliminary signal as indicated by arrows 20 and 22 respectively. The means for producing the first and second preliminary forces are not shown, but may be comprised of any well known device for transmitting sensed signals into position outputs. For example, well known pressure, temperature, or speed sensing devices utilized for sensing engine operating conditions of combustion engines may be utilized to axially or rotatably position gear 18 in response to the sensed conditions as taught in copending application Serial No. 499,432, filed April 5, 1955, in the name of H. J. Williams, F. R. Rogers and B. J. Ryder and assigned to the same assignee as the present application. A pivotally supported cam follower 24 is urged into contactive engagement with the contoured surface of cam 12 by spring 26 such that the angular position of follower 24 is controlled as a desired function of the preliminary inputs to gear 18. A differential area servo motor 28 is provided, having a pilot control valve 30 and a supply of control fluid supplied from a source, not shown, through constant pressure regulator valve 32 and conduit 34. A branch conduit 36 includes a restriction 38 and supplies a control fluid to one side of motor 28 which may be varied in pressure by operation of pilot valve 30. Thus angular movement of cam follower 24 is transmitted by means of servo pilot valve 30 and servo motor 28 into axial movement. The motor 28 may be considered an input member for our combining apparatus which is to be presently described. It should be noted however that the position of motor 28 itself may be responsive to a plurality of previously combined signals.

A shaft 40 is integrally connected to motor 28 so as to be axially positioned in response to input signal movement. Primary and secondary three dimensional contoured surfaces 42 and 44 respectively are formed on opposite sides of shaft 40. A first cam follower 46 is pivotably secured about a support shaft 48 and engages a control valve 50 so that any angular movement of follower 46 is operative to control the axial position of valve 50. Valve 50 includes first and second circular land projections 52 and 54 and spring retainer disc 56 arranged along its length. A spring member 58 is fixedly held at one end and abuts retainer 56 on the other so that a force is transmitted through valve 50 to cam follower 46 urging said cam follower in contactive engagement with primary contoured surface 42. A second cam follower 60 is pivoted at support 62 and is connected to the first cam follower 46 by means of an interconnecting link 64. The link 64 is operative to maintain cam follower 60 a small clearance distance away from the secondary contoured surface 44 such that for normal operation, the primary contoured surface 42 is alone operative to control the position of cam follower 46. The contour of secondary surface 44 is a substantial mirror image or reverse contour of the primary surface 42, that is for a given movement of shaft 40, the cam surface 42 contacting follower 46 may increase a given amount in height while the cam surface 44 directly underneath cam follower 60 will decrease a like amount in height. Thus the clearance distance of follower 60 from surface 44 established by link 64, during normal operation, will be maintained substantially constant. A pair of ports 66 and 68 are contained in the conduits 70 and 72 respectively, and are operative with the land projections 52 and 54 of valve 50 to provide variable size openings. Constant pressure control fluid from servo motor 28 is transmitted by conduit 74 to chambers formed on opposite ends of valve 50 wherein said constant pressure fluid contacts the left face of land projection 52 and the right face of land projection 54. It should be noted that the pressure transmitted to the opposite ends of valve 50 need not necessarily be regulated to a constant pressure, but rather could be comprised of any relatively high pressure fluid source available. Fluid leakage from servo control valve 30 accumulates within the interior of housing 10, and is returned to a low pressure fluid reservoir, not shown, by means of return conduit 76. Thus the interior of housing 10 is maintained full of low pressure fluid which operates as a lubricating medium for moving parts contained therein, and also as a low pressure fluid source which is supplied to a chamber intermediate to the land projections 52 and 54 of the valve 50 by an opening 78 wherein said low pressure fluid contacts the right face of projection 52 and the left face of projection 54. A piston 80 is provided, and is contained in a cylinder 82 which has been illustrated with the end plates removed. Control fluid is supplied to the left face of piston 80 by conduit 70 and to the right face of said piston by conduit 72. Valve 50 has an intermediate position which may be termed the "null" position wherein the land projections 52 and 54 cover orifices 66 and 68 an equal degree, thus equalizing the pressure in conduits 70 and 72 acting on opposite sides of piston 80, such that the forces acting on said piston are in balance and no movement results. As valve 50 moves to the left in response to movement of cam follower 46, low pressure fluid is communicated to conduit 70 and high pressure fluid to conduit 72 which establishes a force unbalance across piston 80 moving it to the left. If valve 50 should move to the right, the force unbalance across piston 80 will exist in the opposite direction causing said piston to move to the right. An output shaft 84 is secured to piston 80 so as to be movable therewith, and is adaptable to control the position of any device desired to be controlled. Thus shaft 84 may be considered an output member whose position is to be controlled in response to that of the input member or servo motor 28. A flexible cable 86 is secured to the right end of shaft 84 and engages the circumference of the wheel member 88 which is mounted on rotatable shaft 90 so that the angular displacement of said shaft is responsive to the axial displacement of shaft 84. A torsion spring or other expedient well known in the art, not shown, is operative to bias wheel 88 in one direction of rotation to insure that cable 86 remains in tension and does not buckle when translating movement. A first gear 92 is formed on the end of shaft 90 and engages a second gear 94 integral with shaft 40 to rotate said latter shaft and the contoured surfaces 42 and 44 formed thereon.

Figure 2 is a sectional view taken along a vertical plane passing through cam followers 46 and 60 to more clearly show the relationship of said followers. The followers are rotatably secured at the supports 48 and 62 and interconnected by link 64. The force applied by spring 58 and transmitted through valve 50 acts on the lower end of follower 46 in a counterclockwise direction as indicated by the arrow to urge said follower into contactive engagement with contoured surface 42. The length of link 64 is such that the follower 60 is maintained a small clearance distance from contoured surface 44. Adjustments 96 and 98 are provided to increase or decrease the clearance distance of follower 60 from contoured surface 44.

Figure 3 is another sectional view taken along a horizontal plane along the axis of shaft 40 to more clearly show the relationship of the contoured surfaces 42 and 44 formed on the shaft 40. Each contoured surface of the embodiment illustrated occupies substantially 180° of arc along the circumference of shaft 40 and as previously disclosed the contours are the substantial reverse or mirror image of one another. It should be understood, however, that contours 42 and 44 may be readily made to include more or less than 180° of arc by either offsetting followers 46 and 60 or using only part of the rotating range of shaft 40 and 180° of contour has merely been shown herein to represent the more usual case.

*Operation*

A plurality of preliminary signals responsive to operating conditions of an engine or the like are combined by three dimensional cam 12 to produce an axial position of servo motor 28. The position of servo motor 28 may be considered a position input signal to the combining apparatus formed by cam surfaces 42 and 44, cam followers 46 and 60, servo pilot valve 50, and piston 80. As the servo motor 28 moves, as for example to the right, shaft 40 and contoured surfaces 42 and 44 are also moved to the right. The height of primary contoured surface 42 contacting follower 46 decreases as shaft 40 moves to right, thus rotating follower 46 and moving pilot valve 50 and piston 80 to the right. Rotational movement of follower 46 is transmitted through link 64 to follower 60 and rotates follower 60 away from the secondary contoured surface 44. The height of secondary surface 44 in closest proximity to follower 60 increases so that the clearance distance remains substantially constant. As piston 80 is moved to the right, shaft 40 is rotated by means of the connection formed by flexible cable 86, wheel 88, shaft 90 and gears 92 and 94. The rotation of shaft 40 causes the primary contoured surface 42 to be displaced in a rotative direction and increase the cam heigth contacted by follower 46 which repositions valve 50 back to its "null" position where it equally covers ports 66 and 68 and balances the fluid pressure forces acting on piston 80. Movement of servo motor 28 in the reverse direction or to the left would move valve 50 and piston 80 to the left and further cause rotation of shaft 40 through the feedback connection 86 to restore the position of valve 50 to its original "null" position.

If while traveling to the left, pilot valve 50 should encounter increased resistance to movement due to possible accumulation of impurities along the sliding surfaces or the like, the positive connection through follower 46 to primary contoured surface 42 would force valve 50 past any such obstruction so that the system would remain operative. If on the other hand, increased resistance to rightward movement of valve 50 were encountered, the maximum force available to urge valve 50 past such an obstruction would be that provided by spring 58. Generally, it is desirable that spring 58 be relatively light or provide a small force in order to minimize deflection and wear problems of the follower 46 and primary surface 42. Therefore, in order to provide a relatively light loading spring 58 and yet to insure that means are provided to overcome increased resistance to the rightward movement of valve 50, a secondary contoured surface 44 is provided. When the force necessary to move valve 50 to the right exceeds that provided by spring 58, follower 46 will rotate out of contact with surface 42 and follower 60 will take up the small clearance distance and engage surface 44. The contour variations of surface 44 will then be transmitted through follower 60, link 64, follower 46, to the valve 50 where positive contact will be provided to move said valve to the right. By means of the adjustments 96 and 98 shown in Figure 2, the clearance distance may be adjusted to any desired amount, and in the interest of accuracy will normally be adjusted as small as possible.

Incremental changes in the contour of surfaces 42 and 44 may be designed to be either uniform or non-uniform in the axial or rotative directions. In the case of uniform incremental contour variations, our combining apparatus would be operative to linearly translate the movement of input member 28 to the output member 84 so that the output movement may be a one to one relationship with input movement, or any first order mathematical function thereof. By designing the contour of the surfaces to have non-uniform incremental variations, the movement of member 84 may be a higher order mathematical function of the input member so that our combining mechanism may be used to provide a non-linear output for a linear input, a linear output for a non-linear input, or a different non-linear output for a given non-linear input. For example, if the angular movement of cam follower 24 should tend to distort the output of cam member 12 such that the axial position of piston 28 is some trigonometric function of a desired position, the contour of cam surfaces 42 and 44 may be designed in an axial direction so as to remove any such distortion.

Although only one embodiment of our combining apparatus has been illustrated and described it will be readily apparent to those skilled in the art that various changes in the structure and relative arrangement of parts may be made to suit individual requirements without departing from the scope and spirit of the present invention.

We claim:

1. In control apparatus for amplifying the power or stroke of a movable input member to a movable output member, the combination of a servo motor including a servo control valve connected to said output member, a cam member movable in a first and second direction and including a primary and secondary contoured surface, a first cam follower connected to said servo control valve for controlling the position of said output member as a function of the position of said first cam member, spring means operative to apply a force to said first cam follower to hold said first cam follower in contactive engagement with said primary contoured surface, a second cam follower, a link connecting said second cam follower to said first cam follower and operative to maintain said second cam follower a relatively small spaced clearance distance from said secondary contoured surface, said first and second cam followers being arranged with respect to said cam member such that movement of said first cam follower away from contact with said primary contoured surface is transmitted through said link to move said second cam follower into contactive engagement with said secondary contoured surface, and said cam member being connected to said input and output members so as to be positioned in said first direction in response to movements of said input member and positioned in said second direction in response to movement of said output member.

2. In control apparatus for amplifying the power or stroke of a movable input member to a movable output member, the combination of servo means connected to said output member for controlling the movement thereof, means connected to said input and output members responsive in position to the respective positions of said members, said last named means including a primary and secondary contoured surface, a first lever connected to said servo means for controlling the operation thereof, force means operative to apply a force to said first lever to maintain said lever in contact engagement with said primary contoured surface, a second lever, and connecting means interconnecting said first and second levers such that said second lever is maintained a relatively small clearance distance from said secondary contoured surface, said first and second levers and said primary and secondary contoured surfaces being mutually arranged such that movement of said first lever out of contact with said primary contoured surface moves said second lever into contact with said secondary surface.

3. A control apparatus as claimed in claim 2 wherein said primary and secondary contoured surfaces are three dimensional cam surfaces.

4. A control apparatus as claimed in claim 3 wherein said secondary contoured surface is the reverse or mirror image contour of said primary contoured surface.

5. Apparatus for combining a plurality of mechanical position signals for positively positioning an output member as a desired function thereof comprising: a movable member having first and second oppositely arranged three dimensional contoured surfaces formed thereon; first and second movable input members responsive in position to desired input signals connected to said movable member to control the position thereof in axial and rotative directions respectively; a lever arrangement having first and second interconnected and pivotably secured cam followers arranged with respect to said contoured surfaces such that said first cam follower is in contactive engagement with said first contoured surface and said second follower is a relatively small spaced distance from said second contoured surface; force applying means connected to said lever arrangement to maintain said first follower in contactive engagement with said first surface and urge said second follower away from said second surface; said lever arrangement being connected to said output member to control the position thereof.

6. Apparatus for combining a plurality of mechanical position signals as claimed in claim 5 wherein said second movable input member is interconnected to said output member to provide an output member feedback signal.

7. Apparatus for combining a plurality of mechanical position signals as claimed in claim 5 wherein said movable member is a cylindrical shaft and said first and second contoured surfaces are formed within opposite semicircular segments thereof.

8. Apparatus for combining a plurality of mechanical position signals as claimed in claim 5 wherein said first and second oppositely arranged contoured surfaces have the reverse or mirror image contours of one another.

9. Apparatus for positioning an output member subject to variable resistance to movement comprising: a cam member having first and second three dimensional contoured surfaces formed thereon; a first cam follower connected to said output member and operative to control the position thereof; force applying means operative to apply a predetermined force to said first cam follower urging said first follower into contactive engagement with said first contoured surface; a second cam follower located a small spaced distance from said second contoured surface; said second cam follower being interconnected to said first cam follower such that said second cam follower is moved into contactive engagement with said second contoured surface when the predetermined force acting on said first cam follower is exceeded by the resistance to movement of said output member.

No references cited.